Dec. 1, 1970 G. T. KRAEMER ET AL 3,544,814

COINCIDENCE GATE TIMER

Filed Nov. 29, 1967 2 Sheets-Sheet 1

INVENTORS G. T. KRAEMER
G. P. PASTERNACK

BY Charles E. Graves

ATTORNEY

United States Patent Office 3,544,814
Patented Dec. 1, 1970

3,544,814

COINCIDENCE GATE TIMER

George T. Kraemer, Warren Township, Somerset County, and Gerald P. Pasternack, Matawan, N.J., assignors to Bell Telephone Laboratories Incorporated, Murray Hill and Berkeley Heights, N.J., a corporation of New York Filed Nov. 29, 1967, Ser. No. 686,605
Int. Cl. H03k *17/28, 19/22*
U.S. Cl. 307—246 3 Claims

ABSTRACT OF THE DISCLOSURE

A telephone protection of service system is described which includes a timing circuit relying upon a single stage responsive only to both of two inputs to produce a delayed output that minimizes the risk of mistriggering on voice signals.

This invention relates to timing circuits and more specifically to a coincidence gate timer characterized by high reliability and low cost.

BACKGROUND OF THE INVENTION

A familiar requirement in transistor logic circuitry is to fix a two-level output in its first mode whenever either or both of two inputs are absent, to switch the output to its second mode a fixed time after the application of both inputs and to return the output to the first mode directly upon removal of either or both inputs. This requirement typically is met with coincidence gate timers, a large number of which are available in the art.

The present invention concerns a new structure for a coincidence gate timer and, by way of illustration, its particular application to a protection of service system between telephone private branch exchanges and the switching network.

One object of the invention is to increase the reliability and sensitivity of coincidence gate circuitry.

A more specific object of the invention is to assure detection and blocking of telephone calls originated from customer-operated and maintained telephone stations which are normally connected for use only within and between PBX's.

A more general object of the invention is to avoid triggering of a timing circuit in the presence of voice signals which may randomly contain the timing circuit triggering code.

SUMMARY OF THE INVENTION

In accordance wth a prime facet of the invention, the closure of two serially connected inputs to a gate applies an input voltage to the emitter of a transistor and sets a timing circuit which biases the transistor base a prescribed time to maintain cutoff. The circuit then causes the transistor collector-emitter junction to saturate so that the collector-connected output circuit voltage assumes the value of the input voltage. The coincidence gate timer of the present invention uses but a single stage, which is made possible by referencing of the transistor's emitter to the input rather than to the usual fixed potential.

A prime feature of the invention is that the timing interval is virtually independent of transistor parameters as well as of supply voltage.

A detailed understanding of the invention, its further objects, features and advantages will be gained from the description to follow of an illustrative embodiment thereof.

DETAILED DESCRIPTION OF THE INVENTION

Figure 1:
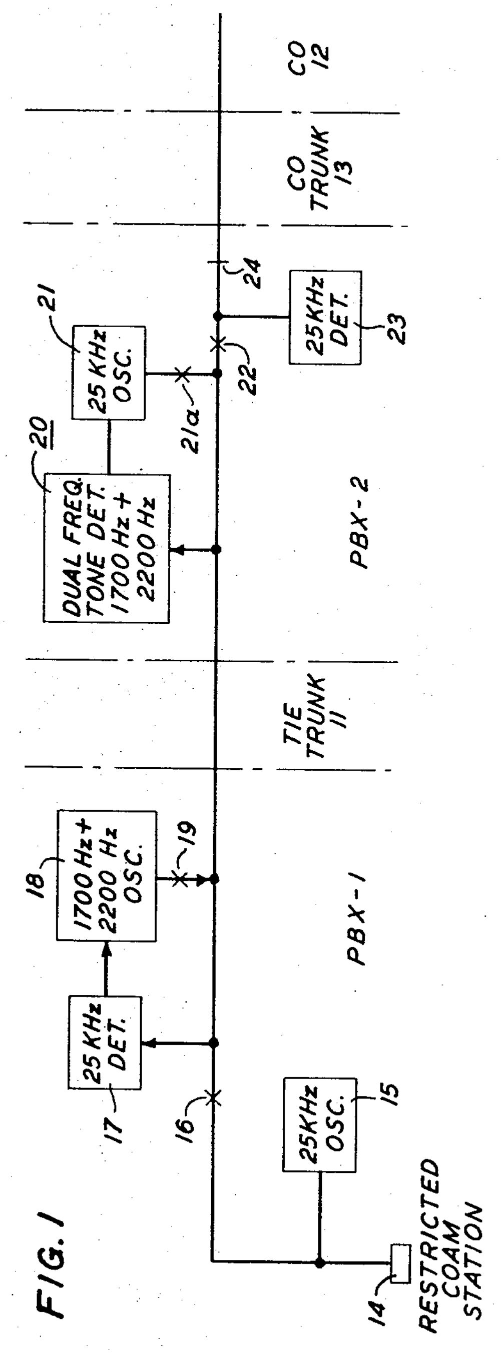
FIG. 1 is a block diagram of a telephone network including a protection of service feature.

The invention is illustrated in relation to a telephone inter-PBX protection of service (POS) system depicted in block diagram form in FIG. 1. Shown are two PBX's, designated PBX–1 and PBX–2, connected by a tie trunk 11. PBX–1 and PBX–2 are tariff items with the latter connected to the telephone switching network central office 12 through central office trunk 13.

If the PBX customer connects a customer-operated-and-maintained station such as 14 to his PBX–1, it is necessary to ensure that station 14 does not have access to the switching network. One solution is to connect a high frequency oscillator 15 to the line connection between station 14 and PBX–1 which applies, say, 25 kHz. tone to the connection when the station goes off-hook. If the call is outgoing from PBX–1, then switch 16 in PBX–1 is closed connecting detector 17 to the link.

Detector 17 responds to the 25 kHz. tone from oscillator 15 by activating dual frequency oscillator 18 and applying its low frequency tones, which may be 1700 Hz. and 2200 Hz., to the tie trunk 11 by closure of switch 19 which occurs between dial pulses. Dual frequency tone detector 20 is bridged across the line of PBX–2 and, as will be explained below, responds only to the noted two frequencies. In response to these, detector 20 activates a second 25 kHz. oscillator 21 and closes switch **21*a*** which applies the 25 kHz. tone to the line of PBX–2.

If the call dialed from station 14 is one attempted to be placed into the switching network over trunk 13, PBX–2 will routinely respond by closing trunk switch 22. Closure of switch 22 places a second 25 kHz. detector 23 on the line which will respond to oscillator 21. Should this occur—signifying a call originating from restricted station 14 which must be blocked—then detector 23 opens the circuit to central office 12 through switch 24 thus blocking the call.

Figure 2:
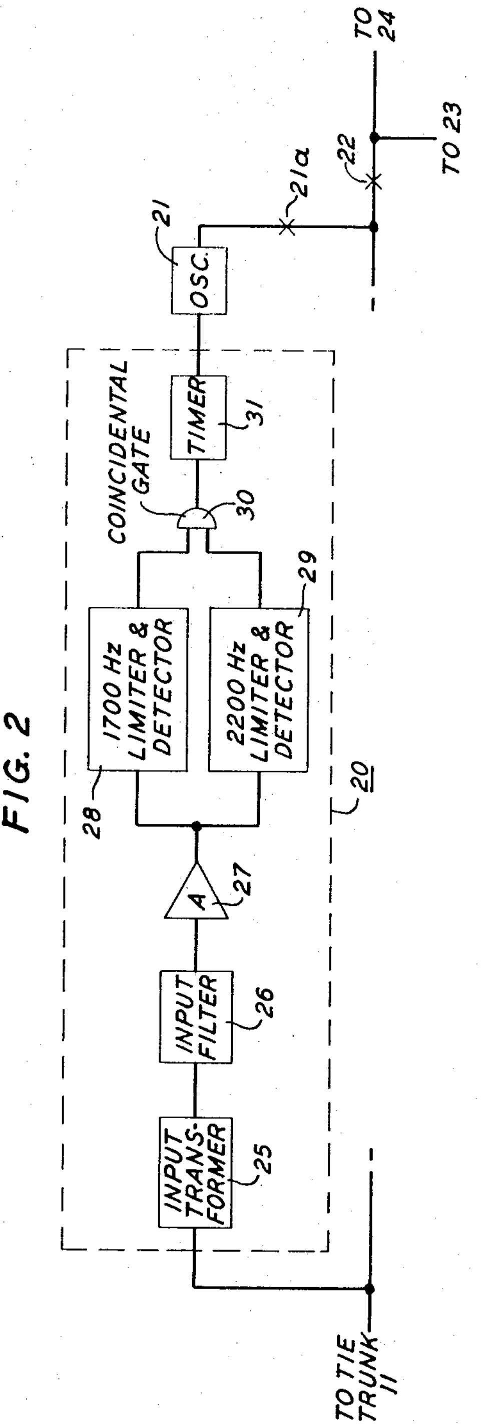
FIG. 2 is a block diagram of a dual frequency tone detector.

Shown in FIG. 2 in block diagram form is the dual frequency tone detector 20 bridged across tie trunk 11 to receive the POS signal. A high input impedance is afforded by transformer 25 so that detector 20 does not affect speech or dial pulses. Input filter 26 is designed to pass energy in the range of 700 Hz. to 3200 Hz., suppressing all out-of-band tones. The filtered signals are amplified in amplifier 27 which supplies gain and an impedance transformation. After being separated into its component frequencies (e.g., 1700 and 2200 Hz.) in conventional fashion, the signal is fed to the limiter-detectors 28, 29. The limiters prevent false outputs due to speech, in the following fashion. When a single POS frequency is present at a limiter input, the output consists of the fundamental frequency (e.g., 1700 Hz.) and its odd harmonics. The output at the fundamental frequency is large enough to operate the associated detector. If the detector-limiter (28 or 29) is exposed to speech, there will be numerous frequencies at the input thereof including possibly a POS frequency. The added frequencies reduce the POS frequency level at the limiter's output, so that the associated detector is not operated.

In each of the limiter-detectors 28, 29 there is a circuit such as a series-tuned circuit whose response is largest near the designed POS signal frequency. The tuned circuit connects to the associated detector. The detector's recognition threshold is set so that only the POS frequency energizes the detector.

The outputs of detector-limiters 28, 29 are combined to form a coincidence gate, designated 30. Advantageously, to provide added protection against false operating due to speech an output is not delivered as soon as gate 30 operates. Rather, gate 30 must remain operated for a prescribed period, such as 105 msec., before the output relay 21*a* is powered. To this end, gate 30 controls a signal timer 31 which causes operation of relay 21*a* after it has run out.

Figure 3:
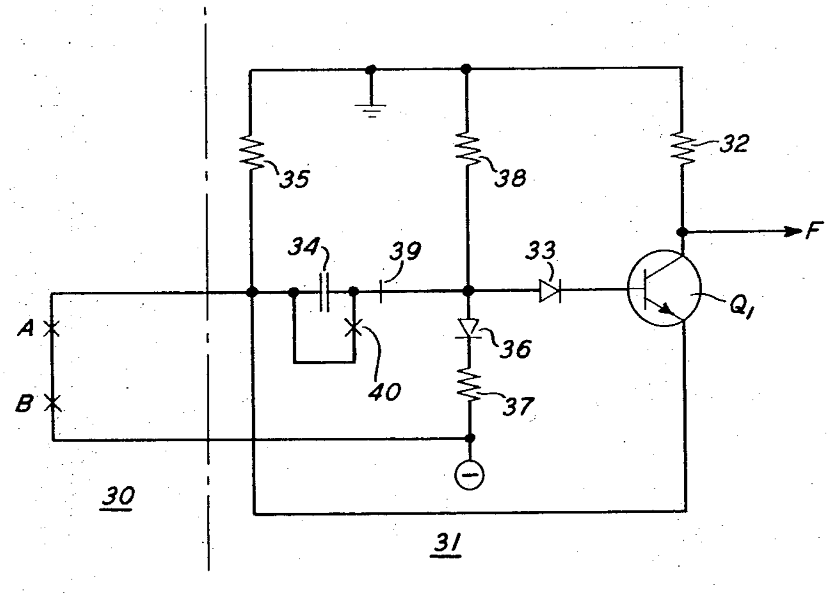
FIG. 3 is a circuit schematic showing a coincidence gate timer.

The combination of coincidence gate 30 and timer 31 is depicted in detail schematically in FIG. 3. The coincidence gate 30 is represented by the contacts denoted A and B. The timer 31 comprises essentially an on-off switch such as transistor $Q_1$. The collector of transistor $Q_1$ is connected to ground through resistor 32, and the base is connected to a diode 33 which prevents reverse breakdown of the base-to-emitter junction. Diode 33 is connected serially between the base and a capacitor 34, one side of which is common to ground through a resistor 35 as well as common to coincidence gate contacts A, B, and to the emitter of transistor $Q_1$. Serially connected in a shunt loop across capacitor 34 are a diode 36 and a resistor 37, the latter being connected to a voltage source —V. Relay contacts 39, 40 help protect against potentially disruptive noise bursts at the tone detector's input, as will be described below.

It is desired that the output F of timer 31 shall be dependent on the input states A, B as follows: (a) When A, B, or A and B are open, the output F is at ground potential; (b) When A and B are closed, output F is to switch from ground to —V after T seconds, and remain at —V as long as A and B remain closed; (c) When A, B, or A and B are again opened, the output F shall return to ground potential.

Given condition (a) above, resistor 37 and the diode resistor 38 form a voltage divider which holds the transistor's base at a potential of $-a$V, (neglecting the drop on diode 36) where $$a=\frac{R_{38}}{R_{37}+R_{38}}$$

Since one side of capacitor 34 is returned to ground through resistor 35, capacitor 34 is also charged to a potential of $-a$V. Because the emitter of transistor $Q_1$ is also returned to ground through resistor 35, the base-to-emitter diode of transistor $Q_1$ is reverse-biased and hence the transistor is off. Point F is at ground potential. When condition (b) is established at time $t=0$, the base of transistor $Q_1$ drops to $-(1+a)$V while its emitter drops to —V. Thus, transistor $Q_1$ remains cut off and F remains at ground potential. The circuit node defined by resistor 38 and capacitor 34 attempts to discharge to ground potential with a time constant $T'=R_{38}C_{34}$. When the voltage across capacitor 34 is such that the base potential of transistor $Q_1$ is approximately —V, transistor $Q_1$ will saturate and output F will be =V. The time required for this to occur is:

$$T=T' \ln (1+a)$$

When condition (c) exists, the base-emitter junction of transistor $Q_1$ is again reverse-biased, and F returns to ground potential. The capacitor 34 recharges through resistors 35, 37 and 38 and the circuit is reset.

It is seen that gate 31 both switches the emitter potential of transistor $Q_1$ and also the potential supplied to capacitor 34. Thus, in accordance with the invention, the emitter of transistor $Q_1$ is referenced to the input signal rather than the usual fixed potential, allowing the use of a single stage rather than a multistage timer. Further, the timing interval is virtually independent of transistor parameters and supply voltage.

Figure 4:
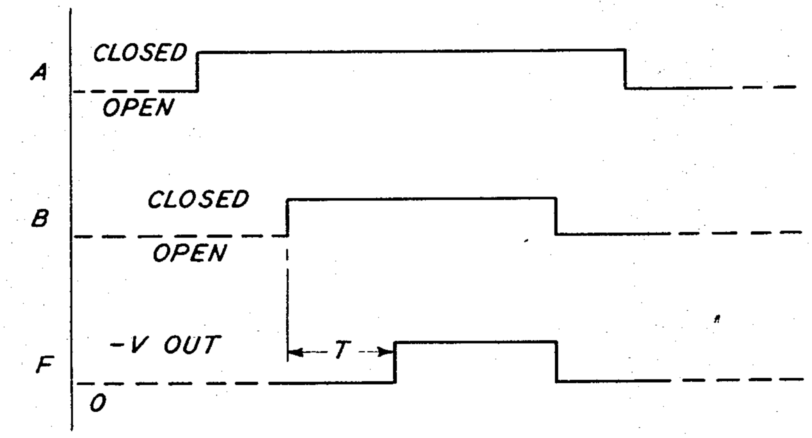
FIG. 4 is a graph of the timer performance.

The graph of FIG. 4 depicts the events subsequent to the closing of A and of B. Only when both A and B have been closed for T seconds does the output F change from ground potential. Then, directly on the occurrence of either or both A or B opening, the output F returns to ground potential.

Relay contacts 39 and 40 which are part of the tone detector's output relay provide a degree of protection against breaking up of the detector's output due to noise bursts of short duration at the tone detector's input.

When the relay operates after the timing interval T, contact 39 disconnects capacitor 34 from the circuit node defined by resistor 38 and diodes 33 and 36. If at some time later a noise burst should override the dual frequency input one or both of the contacts A and B in the coincidence gate 30 may open. Transistor $Q_1$ will turn off and F will return to ground. This results in removal of power from the output relay. There is a delay between the removal of power and the changing of state of the relay's contacts. Capacitor 34 remains isolated from the timer. If the coincidence gate reoperates before the relay releases, transistor $Q_1$ will turn on without delay, restoring power to the relay. Thus there is no interruption in the output due to the short noise burst.

It is to be understood that the embodiments described herein are merely illustrative of the principles of the invention. Various modifications may be made thereto by persons skilled in the art without departing from the spirit and scope of the invention.

What is claimed is:

1. A coincidence gate timing circuit comprising:

AND gate input means;

a single transistor switch comprising base, emitter and collector electrodes, with output means connected to said collector electrode;

a timing circuit with a time constant T connected to said base and comprising a capacitive element;

a voltage source connected to a first side of said capacitive element through said AND gate and to a second side of said capacitive element through a point also common to said base;

means for maintaining a reverse-bias on said emitter in the absence of less than all input voltages on said gate; and means responsive to closure of said gate for switching said emitter bias to a value that would allow conduction, gate closure also switching the potential across said capacitor thereby triggering said timing circuit and also counteracting, through said common point, the switch in emitter bias for a time T after which said transistor conducts, causing an output.

2. A coincidence gate timer pursuant to claim 1 wherein said timing circuit comprises an R-C circuit including a capacitor serially connected between said gate and said base and a resistor connected between ground and a point common to said base and said capacitor.

3. The combination claimed in claim 1 wherein said voltage source, said coincidence gate and said capacitor comprise a loop, said loop further comprising a diode and a resistor, one side of said diode being common to said base and said capacitor.

References Cited

UNITED STATES PATENTS

| | | | |
|---|---|---|---|
| 3,184,607 | 5/1965 | Greene | 307—246 |
| 3,242,420 | 3/1966 | Ulrey | 307—246 |
| 3,246,209 | 4/1966 | Multari | 307—246 |
| 3,453,371 | 7/1969 | Markowitz | 84—1.01 |

DONALD D. FORRER, Primary Examiner

H. A. DIXON, Assistant Examiner

U.S. Cl. X.R.

307—218, 253, 293